I. LINDGREN.
CULINARY UTENSIL.
APPLICATION FILED JAN. 15, 1915.
1,200,741.
Patented Oct. 10, 1916.
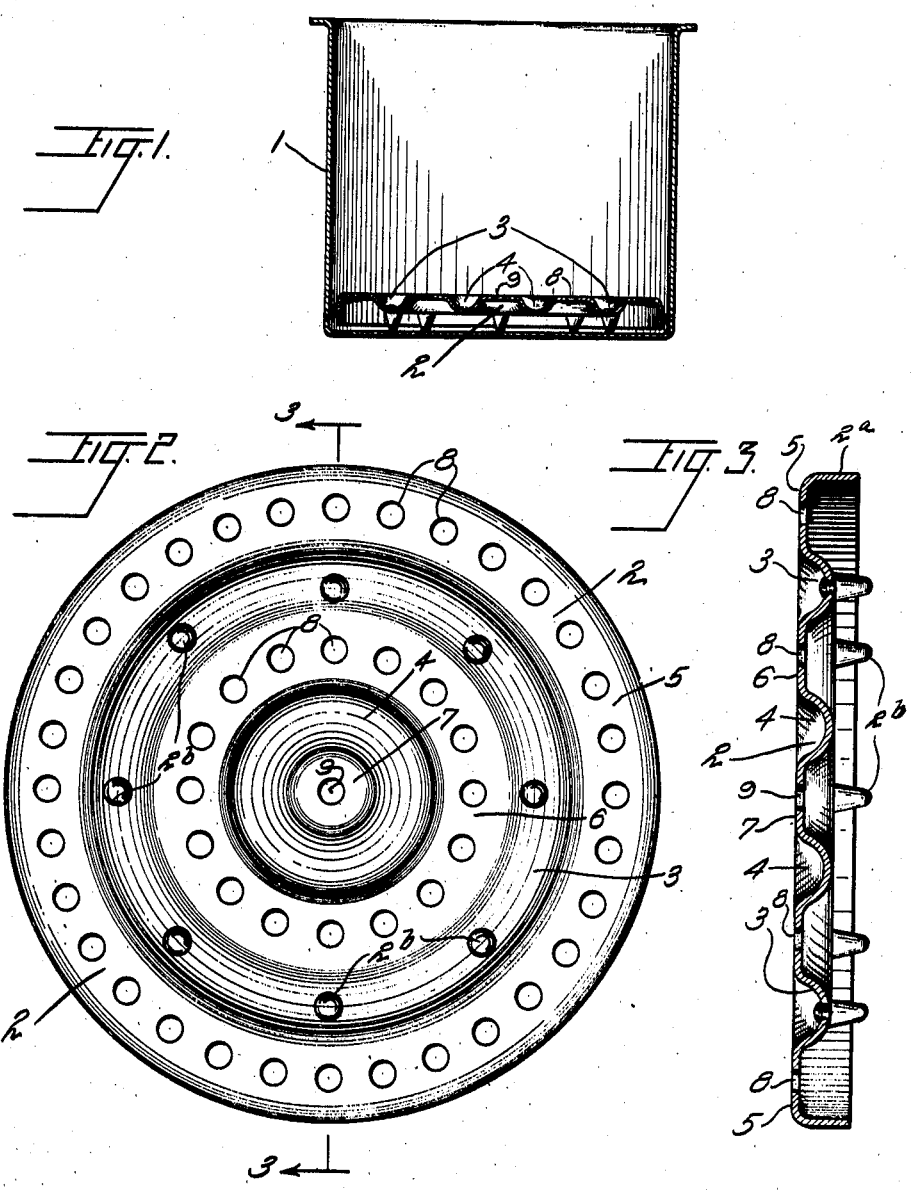
WITNESSES:
INVENTOR
BY
ATTORNEY

UNITED STATES PATENT OFFICE.

INGEBORG LINDGREN, OF MALMO, NEBRASKA.

CULINARY UTENSIL.

1,200,741.  Specification of Letters Patent.  Patented Oct. 10, 1916.

Application filed January 15, 1915. Serial No. 2,389.

*To all whom it may concern:*

Be it known that I, INGEBORG LINDGREN, a citizen of the United States of America, residing at Malmo, in the county of Saunders and State of Nebraska, have invented certain new and useful Improvements in Culinary Utensils, of which the following is a specification.

This invention relates to improvements in culinary utensils, and more particularly to a pot or pan protector in which a false bottom is employed to prevent burning of the contents.

With the foregoing and other objects in view the invention consists in the combination and arrangement of parts to be hereinafter fully described in the following specification, pointed out in the claims and illustrated in the accompanying drawing which forms a part of said specification and in which—

Figure 1 is a vertical section through a vessel provided with my improved protector. Fig. 2 is a plan of the protector. Fig. 3 is a section taken on line 3—3 of Fig. 2.

Like reference characters indicate corresponding parts throughout the several views.

The reference numeral 1 designates a pot or kettle used for boiling or cooking food, 2 is a false bottom of slightly smaller diameter adapted to be placed inside the kettle 1. The false bottom or protector 2 is formed with a down-turned rim 2$^a$ and with feet 2$^b$ upon which it rests in normal position and with two or more concentric grooves 3, 4 and with ridges 5, 6, 7; the ridges 5, 6 being formed with a plurality of apertures 8 and the ridge 7 with a single aperture 9. After the protector is placed in the kettle the requisite amount of water is poured into the kettle.

Should enough water evaporate during the boiling process to bring the water level below the plane of the ridges 5, 6, 7 a certain amount of water will remain in the grooves 3, 4. The water being removed from the fire a greater distance than the water below the protector will remain in liquid form a considerable time after all water in the vessel 1 has evaporated and the water so remaining will be sufficient to prevent burning of the food being cooked upon the protector. The apertures 8, 9 are air holes and permit an air circulation that will tend to keep the heat of the fire away from the water in the grooves and from the food.

What is claimed is:—

1. A protector for food in culinary vessels, having a downturned rim and a plurality of concentric grooves for holding a residuum of water when the general level of the water descends below the upper surface of said protector, said plurality of concentric grooves having their bottoms upraised out of contact with the heater to retain the water in said grooves from evaporation.

2. As a new article of manufacture, a kettle protector formed of a piece of metal provided with feet, said metal being provided with a plurality of concentric grooves disposed in a plane above the plane of the lower edge of the rim, and with a plurality of resultant ridges, said ridges being formed with air holes.

In testimony that I claim the foregoing as my own I have hereto affixed my signature in the presence of two subscribing witnesses.

INGEBORG LINDGREN.

Witnesses:
HERMAN LIND,
F. W. VYBIRAL.